United States Patent [19]

Miller

[11] 4,223,257
[45] Sep. 16, 1980

[54] ADAPTIVE SERVO CONTROL SYSTEM

[76] Inventor: Donald K. Miller, 1402 Lexington Way, Livermore, Calif. 94550

[21] Appl. No.: 960,943

[22] Filed: Nov. 15, 1978

[51] Int. Cl.² ............................................. G05B 11/18
[52] U.S. Cl. .................................. 318/594; 318/640; 250/201
[58] Field of Search ............. 318/593, 573, 640, 594; 250/201; 219/121 EM

[56] References Cited

U.S. PATENT DOCUMENTS

| | | | |
|---|---|---|---|
| 3,719,879 | 3/1973 | Marcy | 318/640 |
| 3,904,945 | 9/1975 | Hassan et al. | 318/593 |
| 3,943,359 | 3/1976 | Matsumoto et al. | 318/640 X |
| 4,016,396 | 4/1977 | Hassan et al. | 318/573 X |
| 4,128,794 | 12/1978 | Burleson | 318/640 X |

*Primary Examiner*—B. Dobeck
*Attorney, Agent, or Firm*—Claude A. S. Hamrick

[57] ABSTRACT

An adaptive position control system including X, Y and θ stages and their associated positioning and motion detection apparatus, position detection apparatus for detecting the position of the stages relative to a fixed reference, X and Y position control subsystems responsive to signals developed by the motion and position detection apparatus and operative to generate coarse mode and precision mode drive signals for application to the X and Y stage positioning apparatus, X and Y adjust subsystems for enabling adjustment of the position detection apparatus, and a θ adjust subsystem operative in a coarse mode and precision mode for adjusting of the angular orientation of the θ stage. Operator control input to the various subsystems is accomplished by means of a joystick control mechanism and central processing unit.

32 Claims, 12 Drawing Figures

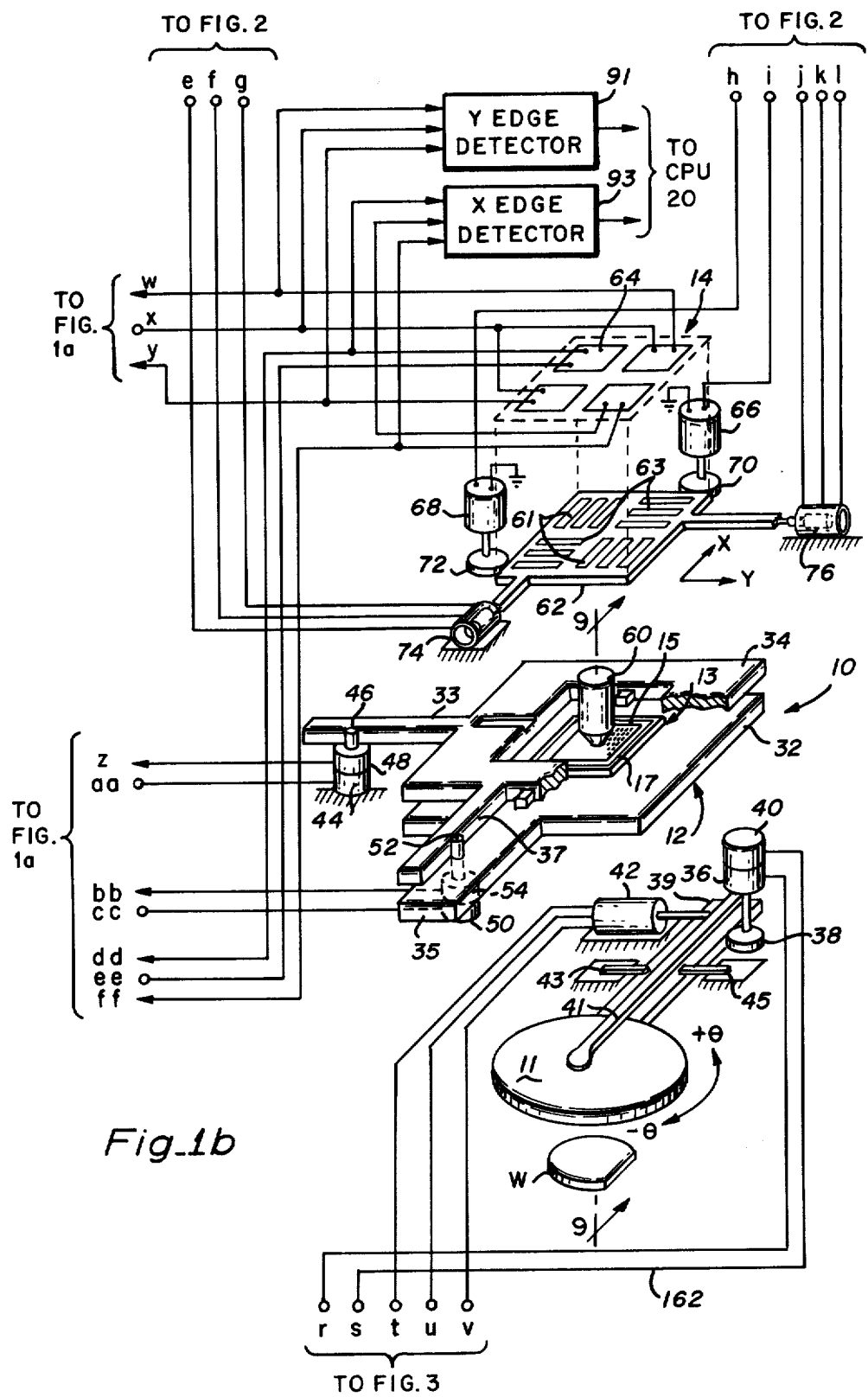
Fig_1b

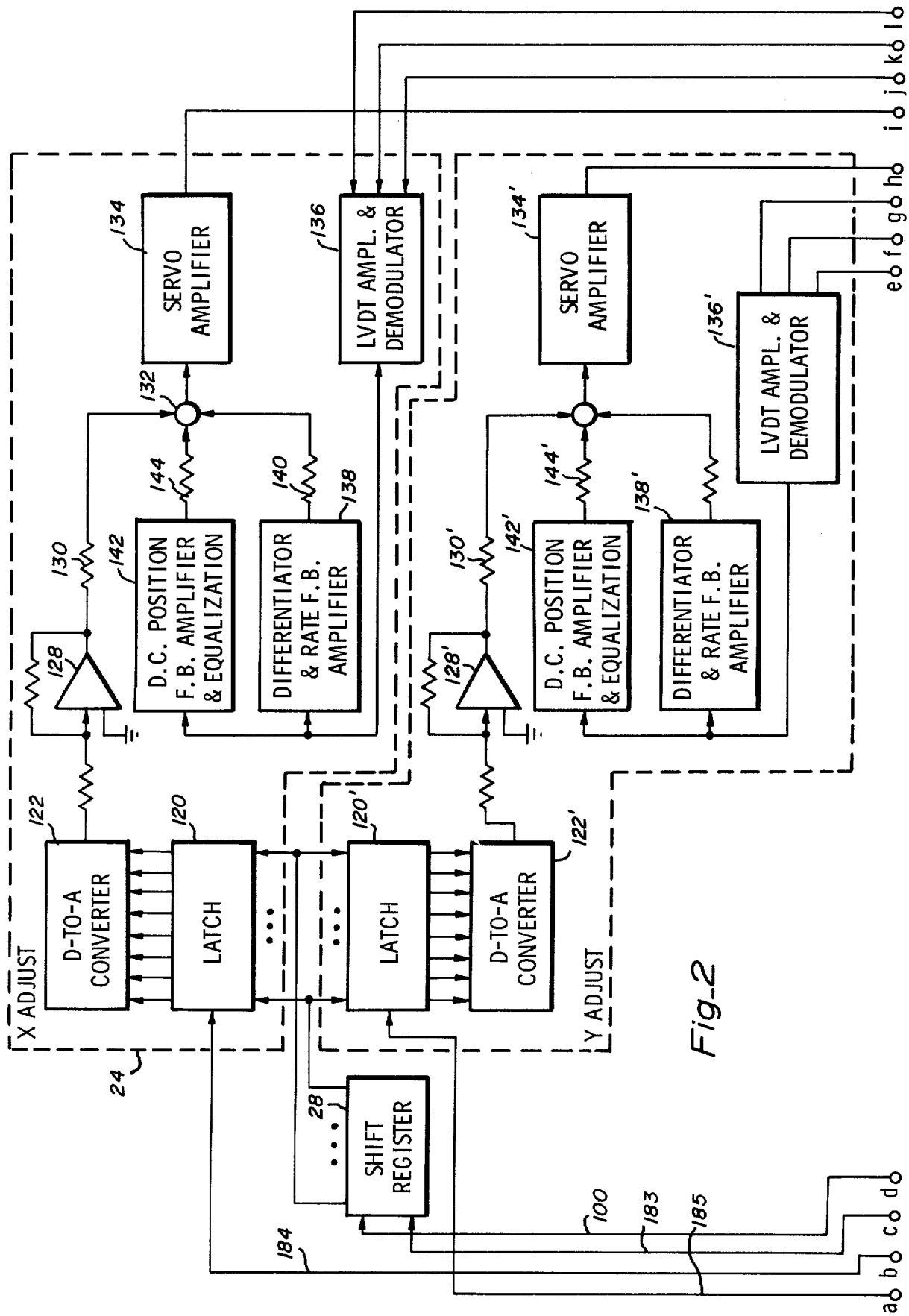
Fig_2

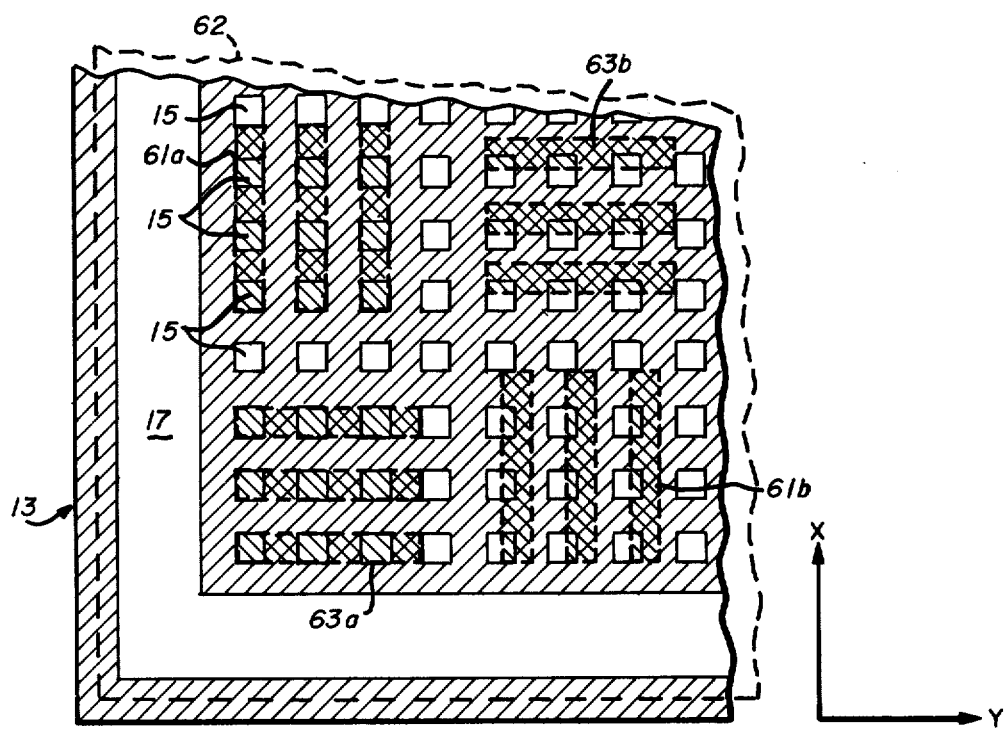
*Fig_5*
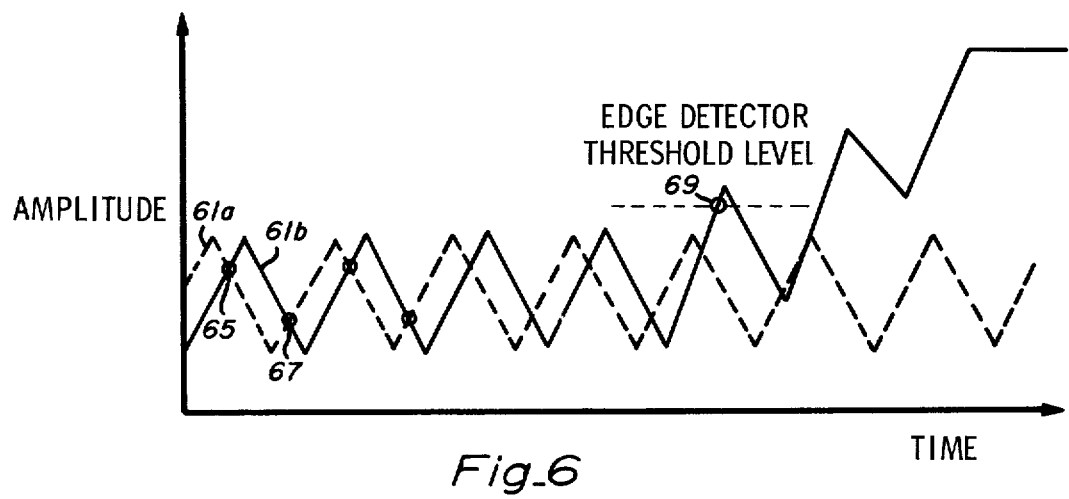
*Fig_6*
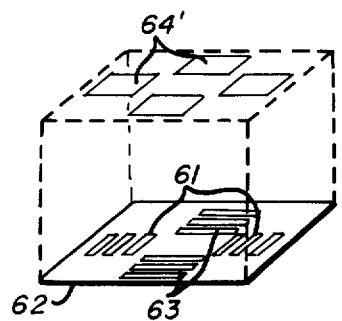
*Fig_7*

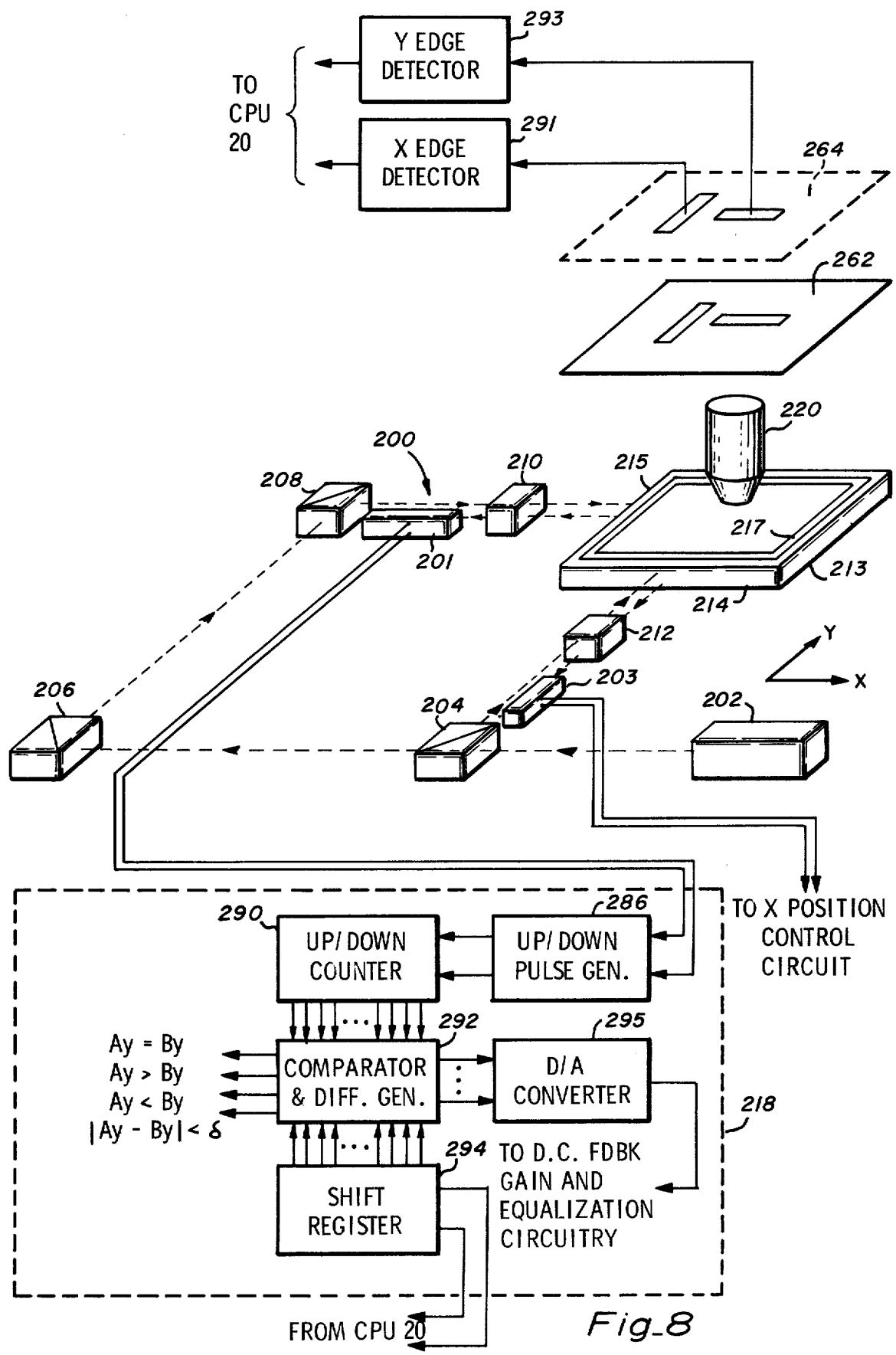
Fig_8

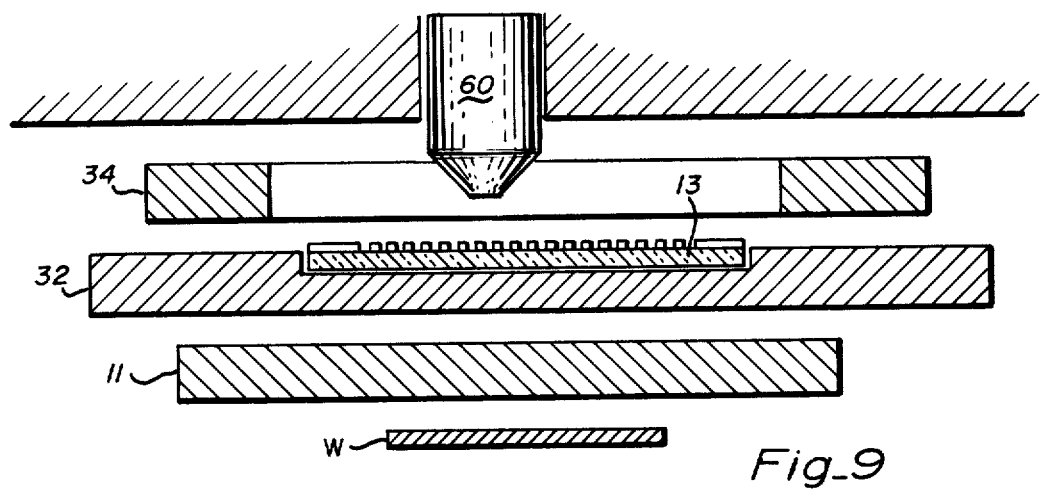
Fig_9
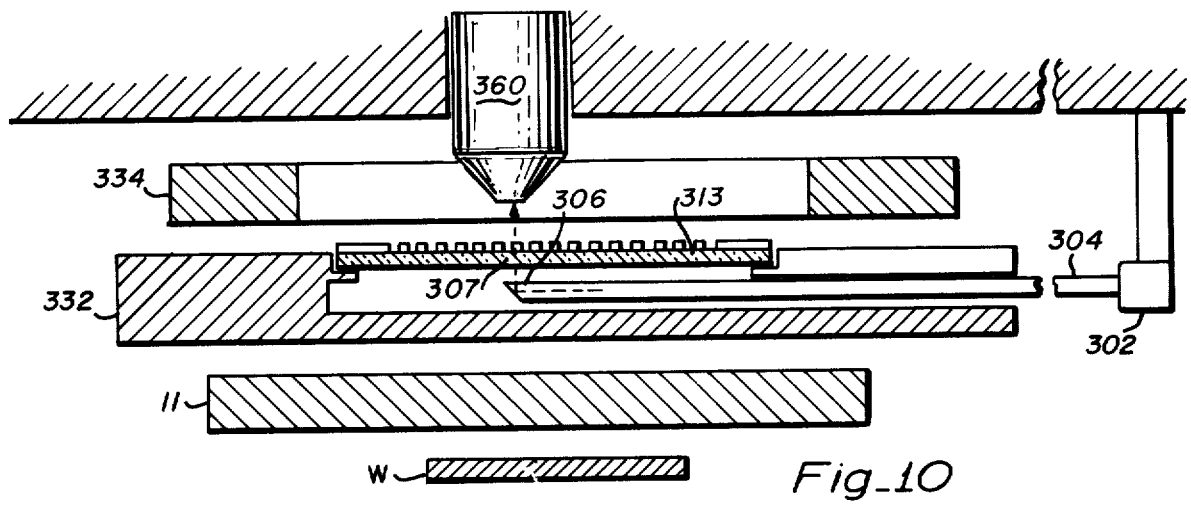
Fig_10
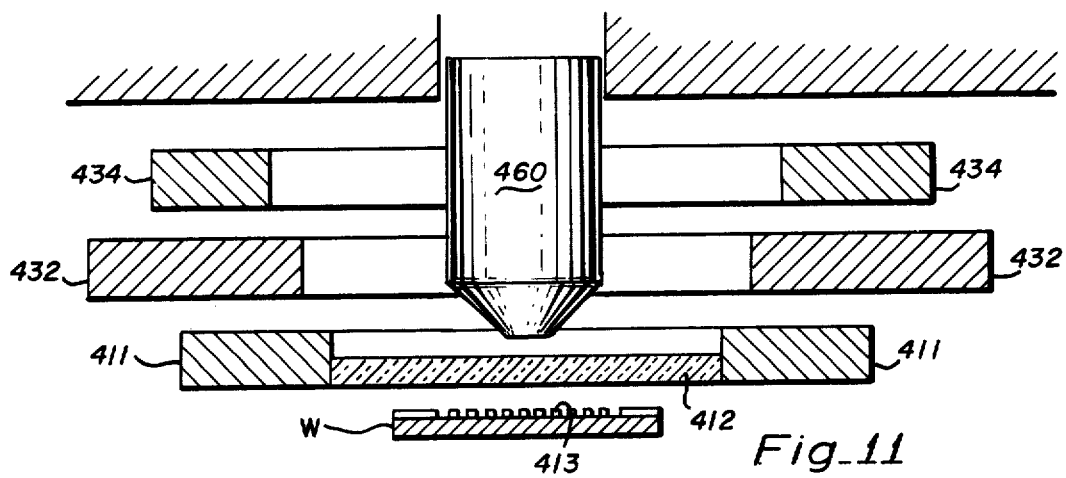
Fig_11

ADAPTIVE SERVO CONTROL SYSTEM

BACKGROUND OF THE INVENTION

1. Field of the Invention

The present invention relates generally to servo control systems and more particularly to a nonlinear, adaptive position control system particularly suited for use in multi-axis control systems having dual mode servo subsystems for energizing a single drive mechanism per axis to effect precision positioning of a work piece relative to a work apparatus and/or optical device.

2. Description of the Prior Art

Although numerous analog control systems and techniques are known in the prior art, there is a class of adaptive position servo systems in which the overall positional accuracy and the required wide dynamic range of travel do not lend themselves readily to a purely analog solution. For example, very few analog reference devices can achieve a linearity in excess of one part in $10^6$.

Even though others have used laser distance measuring interferometer techniques to accomplish such accuracies, these systems have typically required the use of two distinct drive mechanisms. For example, as disclosed in the U.S. patents of Hassan et al, U.S. Pat. Nos. 3,904,945 and 4,016,396, a coarse positioning stage is used in combination with a fine positioning stage. More specifically, the coarse positioning stage is used to position the apparatus in the vicinity of the desired position and is latched in such position while the fine positioning stage, which has a much smaller range of travel, is used to make the final precise movement to the desired location. Obviously, such systems involve a substantial degree of mechanical complexity which could be reduced considerably if a single mechanical drive stage per dimensional degree of freedom were required to perform both the coarse and precision positioning operations.

SUMMARY OF THE PRESENT INVENTION

It is therefore an object of the present invention to provide an adaptive work piece positioning control system which operates in both a high slew mode and an ultra precise positioning mode to actuate a single drive mechanism per dimensional degree of freedom.

Another object of the present invention is to provide a multiple-axis work piece positioning apparatus having adaptive control subsystems which precisely and quickly position with high positional accuracy those carriage elements which are moved along the several axes.

Briefly, the preferred embodiment of the present invention includes X, Y and θ stages and their associated positioning and motion detection apparatus, position detection apparatus for detecting the position of the stages relative to a fixed reference, X and Y position control subsystems responsive to signals developed by the motion and position detection apparatus and operative to generate coarse mode and precision mode drive signals for application to the X and Y stage positioning apparatus, X and Y adjust subsystems for enabling adjustment of the position detection apparatus, and a θ adjust subsystem operative in a coarse mode and precision mode for adjusting of the angular orientation of the θ stage. Operator control input to the various subsystems is accomplished by means of a joystick control mechanism and central processing unit.

Among the numerous advantages of the present system is that the stages can be driven to a selected position very quickly and with a high degree of precision.

Another advantage of the present invention is that operator adjustments of stage position can be easily made by the use of a single joystick controller.

An additional advantage of the present invention is that position control data from the microprocessor is input in digital form to the several subsystems using a single bus line.

Still another advantage of the present invention is that an extremely accurate and stable position detection and control system is provided.

Other objects and advantages of the present invention will no doubt becom apparent to those skilled in the art after having read the following detailed description of a preferred embodiment which is illustrated in the several figures of the drawing.

IN THE DRAWING

FIGS. 1(a) and 1(b) are schematic diagrams illustrating the principal operative components of nonlinear adaptive X and Y position control subsystems in accordance with the present invention;

FIG. 2 is a schematic diagram illustrating X and Y adjust subsystems which are used in combination with the apparatus and position control subsystems shown in FIG. 1;

FIG. 5 is a partially broken illustrating of a reference plate in accordance with the present invention;

FIG. 6 is a diagram illustrating the output of the photodetectors shown in FIG. 1 of the drawing;

FIG. 7 is a diagram illustrating an alternative embodiment of the photodiode and mask array shown in FIG. 1;

FIG. 8 is a schematic diagram illustrating the use of a laser interferometer type position detector as an alternative to the grid type reference plate position detector shown in FIG. 1;

FIG. 9 is a schematically illustrated cross section taken along the line 9—9 of FIG. 1 of the drawing;

FIG. 10 is a schematically illustrated cross section showing an alternative to the embodiment shown in FIG. 9; and FIG. 11 is a schematically illustrated cross section showing another alternative to the embodiment shown in FIG. 10.

DETAILED DESCRIPTION OF THE PREFERRED EMBODIMENT

Figure 1A:
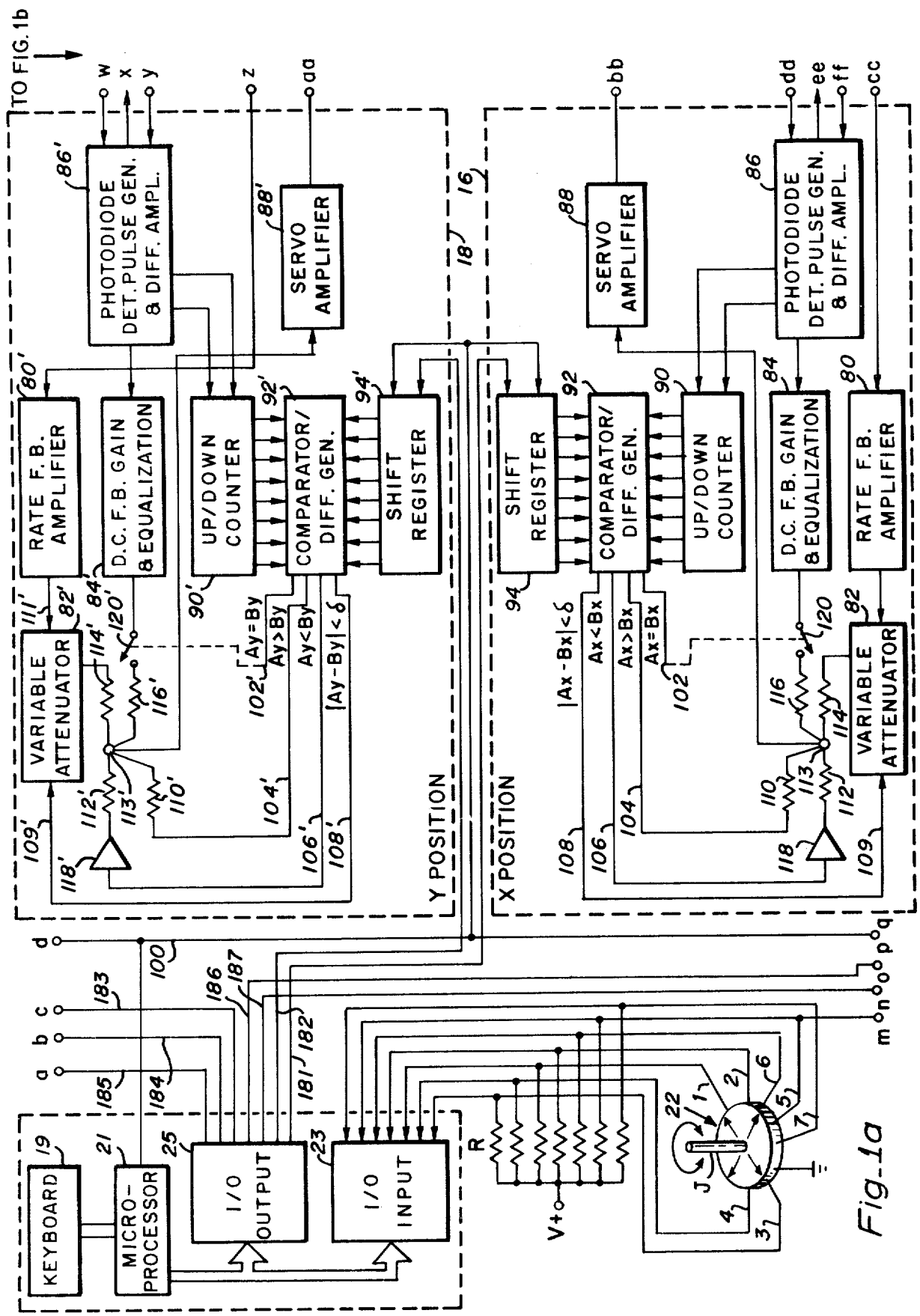
Figures 3, 4:
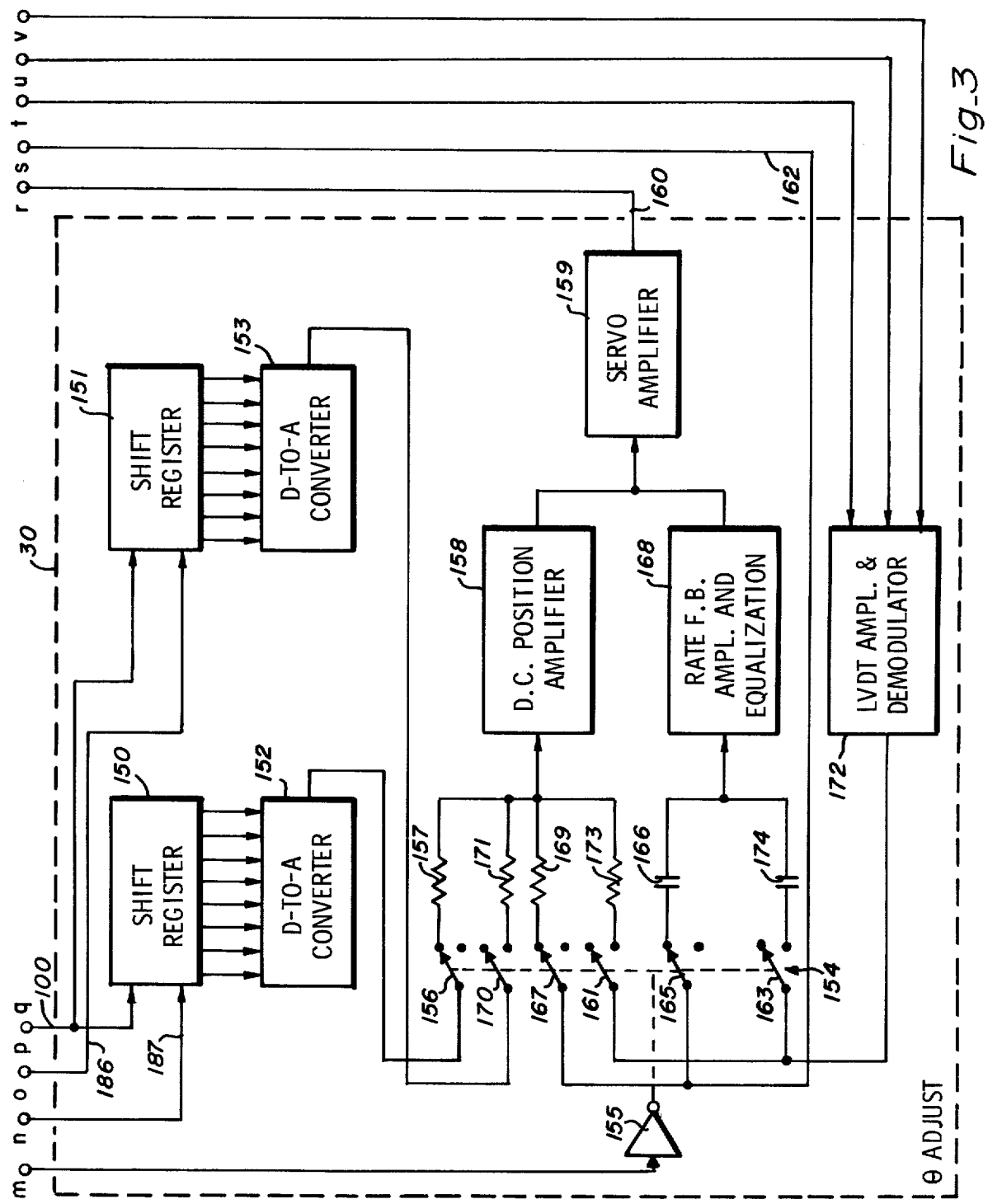
FIG. 3 is a schematic diagram illustrating a θ adjust subsystem which is used in combination with the apparatus and subsystems shown in FIGS. 1 and 2.
FIG. 4 is a diagram illustrating layout of the subsystems shown in FIGS. 1, 2 and 3 relative to each other.

A nonlinear adaptive control system in accordance with the present invention is illustrated in FIGS. 1, 2 and 3 of the drawing with each figure containing a portion of the system. A layout of the entire system can be obtained by juxtaposing the three figures as indicated by the layout shown as FIG. 4. In FIG. 1 there is shown, in exploded schematic form at 10, a positioning mechanism including a θ stage 11, an X-Y stage 12, a reference plate 13, and a photodetection system 14. Also shown are block diagram schematics of an X position control subsystem 16, a Y position control subsystem 18, a central processing unit 20 and a joystick position controller 22. In FIG. 2 there is shown an X adjust subsystem 24, a Y adjust subsystem 26 and a serial-to-parallel shift register 28 for loading data into the subsystems 24 and 26. In FIG. 3, the θ adjust control subsystem is shown at 30.

Although the system of the present invention can be used to control any of a variety of ultra precise positioning devices, for simplicity of illustration, the wafer-positioning mechanism of a semiconductor processing apparatus with repeatable positional accuracies on the order of several microinches is depicted with the several components thereof inverted. Such components are typically arranged such that the upper surface of θ stage 11 (the bottom surface as illustrated) is adapted to support a semiconductor wafer W which is to be processed.

It will be appreciated by those skilled in this particular art that the θ stage and the X-Y stages are of standard air-bearing supported configuration with the circular stage 11 and its several components being carried by the X stage 32 which, along with the Y stage 34, is air-supported upon an ultra flat and stable base platform which for simplicity is not shown. Fixed to the surface (lower as illustrated) of X stage 32 is a θ drive servo motor 36 which drives an eccentric cam 38 and a servo potentiometer 40. Cam 38 engages a side of the arm 39 and serves to rotate the stage 11 about its axis in response to a control signal applied to motor 36. A spring (not shown) biases the bar 39 against cam 38. Positional feedback information is obtained from a linear voltage differential transformer (LVDT) 42 which has its stator mounted to X stage 32 and its core connected to a slip clutching mechanism 41 attached to θ stage 11. Also attached to stage 32 are limit stops 43 and 45, the end of which are spaced apart approximately 0.020 inches in the preferred embodiment so as to accommodate the ±0.010 inch travel limits of LVDT 42. As will be explained in more detail below, this allows the same drive mechanism to be used for both coarse and fine positioning of the stage.

Y stage 34 is driven by a servo drive motor which is affixed to the stage support platform (not shown) and provides stage drive by means of a metal drive capstan 46 which provides metal-to-metal engagement with a drive arm 33 of Y stage 34. Motor 44 also drives a tachometer 48. An X stage servo motor 50 is carried by a projection 35 of X stage 32 such that metal capstan 52 is likewise in metal-to-metal driving engagement with a drive arm 37 of Y stage 34. Servo motor 50 also drives a tachometer 54.

The reference plate 13, as perhaps better shown in the partial illustration of FIG. 5, is typically a glass plate upon which by photolithographic techniques a reference pattern is deposited having an array of rectangular openings 15 that are precision configured and precision located relative to each other so as to provide reference apertures that can be optically followed by the photodetection system 14. In addition, a continuous border aperture 17 is also included to allow for automatic initial stage positioning and limit stop sensing. Alternatively, the inverse pattern could, of course, be used. In the preferred embodiment the apertures 15 in the reference plate are squares that are approximately 10 microns on a side and arrayed on 20 micron centers. A typical reference plate contains approximately 50 million reference apertures. Where the desired positioning resolution is greater along one axis than along the other, rectangular reference apertures may be used instead of square ones.

The photodetection system is attached or referenced to the base platform and includes self-illuminating, magnifying and/or focusing optics 60, a detection reticle 62, four photodiodes 64, and servo motors 66 and 68 for driving eccentric cams 70 and 72, respectively, that impart fine trim adjustment to the system relative to the reference plate 13. Circular eccentric cams mounted within a precision ball bearing are used in the preferred embodiment because of their ease of manufacture, but precision lead screws, etc., can also be used. It is very important that their surfaces be very smooth and free of "negative bumps". The optics 60 in the preferred embodiment provides approximately 10× magnification of the reference apertures but could just as well provide any other desired magnification. For example, an increase in magnification will permit larger absolute positioning error in the X-Y adjust stage for the same overall system accuracy. Thus, the positional accuracy of the X-Y adjust stage does not have to be as precise as the main X-Y stage if the magnification is greater than unity.

Reticle 62 includes four sets of elongated openings, one pair 61 of which is comprised of elongated rectangles having their longitudinal dimensions oriented in the X direction, and a second pair 63 of elongated rectangles which are similarly oriented in the Y direction. The photodiodes 64 are positioned such that each receives light focused through one of the four sets of apertures in the reticle 62. As indicated in FIG. 5 by dashed lines 61a and 61b, and 63a and 63b, one of the aperture sets in each pair is aligned relative to the other set in its pair such that its apertures are approximately 90° out of phase relative to the apertures of the other set when compared to the images of the reference plate openings cast thereupon by optics 60. This allows the system to not only determine alignment with a particular X-Y location but to also determine the direction in which the stage is moving relative to the X and Y axes. For example, as illustrated in FIG. 6, if at the time of signal coincidence the amplitude of the signal detected through apertures 61a is decreasing, and that detected through apertures 61b is increasing, as indicated at 65, then the stage is known to be moving in the positive Y direction. If, on the other hand, the opposite is true, then the stage must be moving in the negative Y direction, etc.

For automatic alignment, it is desirable that the sensing means be able to detect an edge along one axis without interference from an edge along another axis. One way in which this can be insured is to arrange the diodes and mask as illustrated in FIG. 7 rather than as shown in FIG. 1. In this embodiment the photodiodes 64' and corresponding apertures 61' and 63' of reticle 62' are positioned as illustrated so that, for example, when one of the sets of apertures 61' is focusing light from a reference plate border onto its photodiode, neither one of the sets 63' are focusing border light onto their photodiodes.

In the preferred embodiment, the optics 60 is secured to the system base platform, and the photobodies 64 and reticle 62 are movable relative thereto as a unit. Positioning feedback signals indicating displacement of system 14 in the X and Y directions are provided by LVDT devices 74 and 76, respectively. Obviously, the clearance between the outside diameter of the LVDT core and the inside diameter of its coil must be slightly in excess of the peak-to-peak travel of the X or Y adjust subsystems approximately 0.030 inch in this particular application.

Turning now to the adaptive control system of the present invention, it will be noted that the CPU system 20 includes a keyboard 19 for inputting new "desired position data" into a microprocessor 21, and input and output interface units 23 and 25, respectively. Inputs to CPU 20 for causing additional position adjustments are made through a joystick device or other suitable position controller 22. It will further be noted that the X position control subsystem 16 and the Y position control subsystem 18 are essentially identical (except for inertia compensation), and each includes a rate feedback amplifier 80, a variable attenuator 82, a dc feedback gain and equalizer subcircuit 84, a photodiode detector, pulse generator and differential amplifier circuit 86, a servo amplifier 88, an up/down counter 90, a comparator/difference generator 92 and a shift register 94. For convenience of description, the components of subsystem 16 are indicated by unprimed call-out numbers while the corresponding like components of the Y position control subsystem are indicated by primed call-out numbers.

The system is initially aligned by positioning the X and Y stages with a particular region, such as a corner or two sides of the border surrounding the reference rectangular patterns of the reference plate 13 disposed in the viewing area of optics 60. The up/down counters 90 are at the same time reset to zero or any other convenient reference count by a signal from CPU 20 so as to indicate a start position in the X and Y directions.

For those applications in which automatic alignment is to be included, X and Y edge detectors 91 and 93 are provided for sensing the border aperture 17 and causing an appropriate signal to be input to CPU 20. Such detection is accomplished when the aperture 17 causes the output of one of the photodiodes 64 to exceed a threshold level such as is shown at 69 in FIG. 6.

In order to move the stages to a new position, a set of X-Y "desired position data" is input to the shift registers 94 via keyboard 19, the controller 22 or (under automatic control) by microprocessor 21 for comparison with the counts in counters 90. As a result, the difference generator 92 will generate signals on one of the lines 102–108 representing the difference therebetween depending upon whether the comparison indicates $A=B$, $A>B$, $A<B$, or $|A-B|<\delta$, where A is the actual position and B is the desired new position and $\delta$ is the distance within which the system can stop without overrunning the desired stopping point by more than one-half the center-to-center spacing of adjacent openings in the reference plate 13.

The signals developed on line 102–108 are voltages which are used to vary the gain control applied to the servo amplifiers 88. The gain control networks of the servo amplifiers 88 include resistor 110, 112, 114 and 116, the variable attenuator 82, the inverter 118 and the switch 120. In one embodiment, attenuator 82 is driven to one of two predetermined values determined by the signal developed on line 108 and the output is varied relative thereto by the output of rate feedback amplifier 80 as input at 111. Since line 108 is, as indicated, caused to have one signal state when the difference between A and B is less than $\delta$ and is caused to have another signal state when the difference between A and B is greater than $\delta$, it will be appreciated that it is this output which determines whether the control system is operating in its coarse alignment mode or in its fine alignment mode.

In the case where $A_x$ is less than $B_x$, as for instance when the stage is to move, or is moving, in the positive X direction and wherein a positive voltage signal is developed by generator 92 on the appropriate output line (i.e., line 106 when the $A_x<B_x$ condition is satisfied), the signal is inverted by inverter 118 and passed through resistor 112 to the servo amplifier 88. This causes the servo output to have a polarity which energizes servo motor 50 in the direction to drive the X stage in the positive direction. As the speed of the servo motor increases, an output signal from tachometer 54 develops (increases positively) and this output is amplified by rate feedback amplifier 80 and input to the variable attenuator 82. The attenuated signal is then passed through resistor 114 to the current node 113. The rate feedback current input through resistor 114 is subtracted from the $A_x<B_x$ current signal passing through resistor 112 such that the resultant current input to servo amplifier 88 is reduced and in turn reduces the drive signal applied to servo motor 50. Ultimately, an equilibrium condition is reached with the servo motor 50 driving the tachometer 54 at a speed such that its output is at a level whereby the difference in the currents flowing through resistors 112 and 114 is exactly that required to cause the servo amplifier 88 to drive the servo motor 50 speed at its current value.

When the condition $A_x<B_x$ occurs, generator 92 will produce a positive digital output signal on line 104 (instead of line 106). This signal is not inverted, and after passing through resistor 110 causes servo amplifier 88 to drive servo motor 50 in the opposite direction from the previous case. This, of course, results in a similar reversal in polarity of the output signal from tachometer 54. And similarly, the currents flowing into summing point 113 through resistors 110 and 114 oppose one another to produce an equilibrium speed for a given applied voltage at 104.

In either case, where the difference between A and B becomes less than $\delta$, an output will also be developed on line 108 causing attenuator 82 to change to its more sensitive range. Where A equals B, line 102 will be raised and cause switch 120 to close and couple the output of the dc feedback gain and equalization circuit 84 to the summing point 113 through resistor 116. As a result, the servo loop will be caused to lock into the desired position without becoming unstable.

In general, it can be said that there is an inverse relationship in a linear feedback servo system between positional accuracy and overall system speed of response which results from satisfying the Nyquist Stability Criterion. To overcome some of the drawbacks of the inverse relationship between accuracy and speed of response, the above-described electronics switching and/or processing schemes are included in the servo system to produce a highly nonlinear system having overall performance characteristics which yield a fast response time with high positional accuracy.

Typically, and as in the illustrated embodiment, the reference devices and their associated detection circuitry produce a pair of signals in phase quadrature to one another which are cyclic or repetitive. As was previously indicated, in the illustrated embodiment shown in FIG. 5, this is accomplished by aligning the focused image of the grid pattern with one of the reticle sets so that light from the reference plane grid pattern reaches the reticle sets detector while the apertures of the other set of the pair permits only one-half of the subtended grid pattern to fall onto its corresponding detector. Thus, as the reference plane, and thus the X-Y stages, move relative to the photodetection system, the output of the photodetectors will be approximately triangular but 90° out of phase with each other, as indicated in FIG. 6.

Each intersection of the photodetector-signals input to differential amplifier 86 represents a potential analog stopping position. To stop at the intersections indicated in the lower half plane 67, the polarity of both signals must be inverted by additional circuitry not shown in the drawing. However, without digital processing the analog servo amplifier 88 cannot distinguish the difference between nuls in adjacent cycles; therefore, the number of cycles traversed is recorded in the digital up/down counter 90 which remains in the active state even during the analog stopping or locking mode. The appropriate phase quadrature condition is required for the accurate bidirectional counting of the cycles. It is not a required condition for the analog locking mode. In fact, for analog locking, a pair of signals from the reference element with 180°-phase relationship may be preferred, but is not required.

As previously indicated, the present adaptive servo system involves the use of two feedback paths: (1) a position feedback path through amplifier 86; and (2) a rate or higher derivative feedback path through rate feedback amplifier 80. The output of both paths are to be adjusted in a manner based upon the relative position of the stage from its desired position. This method of adjustment results in a very nonlinear system. In general, the output of the position feedback path, containing the frequency compensation and equalization networks required (when used in conjunction with the rate feedback path which will render the system stable), is disabled from the analog servo until the desired cycle has been counted. Although there are numerous ways to disable this position feedback path, normally it is best to achieve the disabling without adversely affecting the stored charge on the frequency compensation networks (which could result in transient delays). In the illustrated embodiment, the switch 120, which responds to the output developed on line 102 of the comparator 92, is shown positioned in the circuit connecting resistor 116 and the dc gain and equilization circuitry 84. It will be appreciated, however, that this is a schematic illustration and the actual location of the switching means 120 will most likely be within the circuitry 84 so as to eliminate any adverse effect of charge stored in the circuit during open switch conditions.

The rate feedback path receives its input from a precision, wide dynamic range tachometer such as that indicated at 54 and which is connected to the motor or drive assembly 50. During the high speed coarse mode of the stage, for example, when either the A<B or A>B output is present at circuit mode 119, the amount of rate feedback applied to the summing point 113 is 0, or is relatively small compared to the amount of rate feedback signal applied near the desired stopping position.

In one of the simplest embodiments, a small amount of rate feedback is applied to maintain a stable and known speed $\omega_1$ for a fixed coarse input signal during the fast travel mode of the stage. Then the distance $d_1$ required to decelerate from $\omega_1$ to $\omega_2$ can be calculated from the dynamics of the system. In this embodiment $\omega_2$ is the speed from which the servoed stage can stop within less than approximately one-half cycle overshoot of the reference feedback element, i.e., 10 microns in the preferred embodiment. If the allowed overshoot exceeds one-half cycle, then extra precautions in the design must be taken to prevent an unstable limit cycle which can result from the non-linear switching of the system. The rate feedback path output to the control loop must be increased from a value which yields a system speed of $\omega_1$ to a value which reduces stage speed to $\omega_2$ when the difference between the actual position of the stage and the desired position is slightly in excess of $\delta$.

In a more general embodiment, one may increase the rate feedback or the higher order derivatives per some functional relationship to $|A-B|$ in order to achieve a desired deceleration response. Also, in the case where small stage steps are anticipated, the stage may never reach $\omega_1$. Thus, to begin decelerating at $|A-B|=\delta$ may result in unnecessary time delay. In lieu of using the more complex functional embodiment one could use a multi-step process of increasing the rate feedback to achieve an overall faster response time and a smoother deceleration. However, the simple embodiment involving a single step method of increasing the rate feedback until $\omega_2$ has been obtained should not be overlooked because in many actual applications the inertia of the system will adequately smooth out the step applied rate feedback signal. It may be desired to increase the rate feedback even further when the dc position feedback path is switched into the servo drive loop as this may make it easier to stabilize the resulting position servo system.

By adaptively adjusting the rate feedback path in accordance with the present invention and as noted above, it is not necessary to change the input coarse mode signal until the desired cycle of the reference element has been obtained. The coarse mode input signal (A>B or A<B) can be applied and removed in digital manner. Thus, it is not necessary to apply a D-to-A converter to the $|A-B|$ output signal and to apply the resulting analog signal to the servo amplifier input as shown in U.S. Pat. No. 4,015,396. This feature simplified the electronic circuitry.

Although the basic X-Y control system has been described above with respect to a particular application, it will be appreciated that certain alterations and modifications may be made. For example, the stage driving mechanisms could be comprised of any type device that gives a mechanical displacement for some known excitation input signal condition. Such devices are typically electromagnetic, hydraulic, pneumatic or piezoelectric motors, etc.

Moreover, the illustrated rate feedback path could include any rate or higher order derivative determining elements whose output signal magnitude is varied adaptively in some prescribed relationship to the final stopping position. In general, this feedback path will have increased output intensity (gain) as the stage nears its final stopping position. The gain of the rate feedback path is to be varied according to the desired deceleration and the amount of overshoot to be allowed. The gain may be varied in a stepped mode by a switching circuit or by smoothly adjusting a gain determining element (such as by modulating the ON resistance of a field effect transistor by varying its gate signal). Likewise, the rate feedback signal may be processed by a computer and its output increased automatically through the use of a D-to-A converter and fed into the analog rate feedback path. It is predominately the proper wide range adjustment of this path that allows the high speed coarse travel mode and also allows the final stopping position to be stable for extremely small displacement errors.

The system requires a stable reference element to which the actual system position can be compared. Whereas, as illustrated in the preferred embodiment, one may use a very precise pattern contained on a very stable substrate material mounted either to the stage or to a fixed reference point of the system, alternatively, and as will be discussed below relative to the embodiment of FIG. 8, one may use a distance measuring laser interferometer or the like. The system also requires a suitable sensing means for detecting and comparing the pertinent information on the reference element. If the reference element is attached to the movable stage, then the sensing element should be attached to some fixed reference position within the system. Alternatively, these two elements could be interchanged.

During the high speed coarse mode the position feedback path is essentially disconnected from the analog portion of the servo system to prevent interference. However, this dc position information which is in the form of digital counts or pulses must be accurately stored and monitored because it is needed to determine when and how far the stage is from its desired position. Thus, the position information is used to initiate and control the tailoring of the gain in the rate feedback path. Finally, when the stage position is very near its desired position, the dc position feedback path is energized in the analog system and the coarse control signals are removed. However, the coarse control signals are automatically energized if the stage position error exceeds a predetermined value. It is important to note here that the system must still satisfy the normal stability criterion and provide subsequent compensation networks for both the rate feedback path and the dc position path. One aspect of this invention is that the frequency compensation networks in the DC position path can remain fixed for large variations in gain of the dc position path provided the gain of the rate feedback path is adjusted and correspondingly tracks.

From the above, it will be appreciated that the system will always stop the X and Y stages in precisely the position identified by the input coordinates. However, it will be also appreciated that an occasion may arise wherein it is desirable that the stages be smoothly or incrementally adjusted to a position in between one of the stop positions dictated by the reference plate or be rotated relative to the reference plate. In order to permit adjustments in the X and Y directions, the X and Y trim or adjust subsystems 24 and 26 are provided so as to allow one viewing the wafer W or other work piece on the X-Y stage through a microscope (not shown) to make the desired incremental adjustment by simply moving the joystick J of position controller 22 in the appropriate direction.

In the preferred embodiment, the position controller 22 is a switching device having a joystick J which when pushed a short distance to one side or another causes a particular fine adjust signal to be applied to the corresponding line leading to CPU 20. When joystick J is pushed sideways to its limit, it causes a coarse adjustment signal to be applied to the corresponding input line. In addition, when joystick J is twisted in the clockwise direction, it causes a $-\theta$ signal to be input to CPU 20 and when twisted in the counterclockwise direction causes a $+\theta$ signal to be input to CPU 20. When the joystick is twisted in either direction to its limit, it causes a coarse alignment signal to be input to CPU 20.

Although the joystick control unit may take many forms and may even include separate joystick units for providing X-Y and $\theta$ inputs, the illustrated device is comprised of a grounded ring contractor (not shown) which is attached to the joystick J. Positionally arrayed around the body of controller 22 at orthogonal positions are four inner contacts (not shown) each of which are connected to one of the CPU input leads 1-4. The inner contacts are positioned so as to be engaged by the contractor when joystick J is tilted slightly in the direction of the contact(s). In addition, an outer ring contact is provided outside the inner contacts and is positioned so as to be engaged by the contactor when J is tilted to a larger degree in the direction of any of the orthogonal contacts. The outer ring contact is coupled to a CPU input line 5. Since each of the lines 105 is normally coupled to a voltage source V+ through a resistor R, the effect of causing the ring contactor to contact one or more of the line contacts is to pull that particular line or lines to ground and thus provide a corresponding input to the CPU 20. Similarly operative structure responsive to twisting of joystick J provides the $\theta$ drive signals. It is important to note, however, that when the joystick control is embodied in a single unit, provision must be made to insure that in making $\theta$ control adjustments, the operator does not inadvertently input X-Y control input and vice versa. This could be accomplished by providing a suitable lockout feature or by merely providing adequate dead bands between the OFF and ON stick positions.

In response to the inputs received from controller 22, the microprocessor 21 develops digital position signals which are serially input to shift register 28. In this case where coarse control is desired, the digital signal stored in shift register 94 is incremented or decremented. When fine control is desired, the digital signal stored in shift register 28 is incremented or decremented. The incrementing or decrementing occurs at a predetermined rate per the programmed sampling rate of the microprocessor as long as the joystick is actuated.

In the fine adjust control mode, the X coordinate is input into register 28 and the latch 120 is enabled by the CPU 20 so that is receives the X drive signal and outputs it into the D-to-A converter 122. This signal is then amplified by amplifier 128 and fed through resistor 130 and summing point 132 into servo amplifier 134 which drives the corresponding servo motor.

Positional feedback to the X and Y adjust systems is taken from the LVDT units 76 and 74, and is input to the corresponding amplifier and demodulator circuitry 136, the outputs of which are fed into the differentiator and rate feedback amplifiers 138 for input to the summing points 132 through resistors 140, and to the dc position feedback amplifiers and equalization circuitry 142 for input to the summing points 132 through the resistors 144. Adaptive control of the rate feedback path is not required because for this subsystem a dynamic range of 1000:1 is adequate. On the other hand, the "main" positioning subsystems 16 and 18 have a dynamic range of approximately 10,000,000:1.

Referring now to FIG. 3 of the drawing, a similar application of the above-described control circuitry is depicted as used to provide smooth or incremental phase adjustment of the $\theta$ stage. As in the X-adjust and Y-adjust embodiment, both coarse and fine adjustment inputs are provided to CPU 20 via controller 22. Although many types of joystick configurations could be used to obtain the desired control inputs, in the preferred embodiment, a simple two-position right and two-position left rotary switch is coupled to joystick J so that when the joystick is turned a few degrees in either direction, either CPU input line 6 or 7 is grounded. If joystick J is turned further in either direction, the coarse alignment line 5 will also be grounded.

In this embodiment, a first shift register 150 and D-to-A converter 152 are provided for receiving the coarse control signal and a second shift register 151 and D-to-A converter 153 are provided for receiving the fine alignment signal. A bank of switches 154 shown in the coarse alignment configuration are actuated by an output developed by the inverting amplifier 155 in response to the grounding of coarse alignment line 5. As illustrated, the coarse aligment signal is entered into register 150, converted to analog form by converter 152 and input through switch 156 and resistor 157 to dc position amplifier 158. The output of amplifier 158 is then fed into servo amplifier 159 which develops a drive signal on line 160 for input to motor 36.

In response to the coarse drive signal, motor 36 turns cam 38 against arm 39 to rotate the stage 11 about its axis. If the rotation exceeds the spacing between the ends of stops 43 and 45, the slip clutch arm 41 will engage the stop and slip relative to stage 11. Note that during the coarse alignment cycle the switches 161 and 163 are open and thus any output of LVDT 42 is ignored. However, during the coarse alignment operation servo potentiometer 40 develops an output which is fed back along line 162 and through switch 165 and integrating capacitor 166 into the rate feedback amplifier and equalization circuitry 168 which in turn provide rate feedback control to servo amplifier 159. The servo potentiometer output is also coupled into amplifier 158 via switch 167 and resistor 169 to provide a position feedback signal input to servo amplifier 159.

When the coarse alignment is completed, if fine alignment is desired, the joystick is turned back to one of its fine alignment positions maintaining a ground on one of the lines 6 or 7 and a fine alignment input developed by CPU 20 is loaded into register 151. At the same time, as the grounding contact to line 5 is broken, the input to inverter 155 will again go high and cause switches 154 to swing into their opposite positions. As a result, the analog output developed by converter 153 is coupled through switch 170 and resistor 171 into position amplifier 158.

In this mode, as motor 36 causes stage 11 to slowly revolve, the output of servo potentiometer 40 is not fed back to servo amplifier 159 but instead, the output of LVDT device 42 is amplified and demodulated by unit 172 and the resultant output thereof is fed into amplifier 158 through switch 161 and resistor 173. The output of unit 172 is also fed into the rate feedback amplifier and equalization circuitry through switch 163 and integrating capacitor 174. The feedback signals developed by units 158 and 168 are then fed into servo amplifier 159 to provide the required control.

When the operator, who might for example be viewing the wafer W through a microscope, has determined that the wafer is in the correct position, he merely releases the spring-loaded joystick and allows it to return to its 0 position and the positioning operation is complete.

One of the features of the present invention is that joystick information is converted into digital signals which are processed by the CPU and sent over a single data line 100 to any one of the several control subsystems and then converted to analog signals for driving the appropriate servo motors. More specifically, X position data is loaded from line 100 into register 94 by raising enable line 181, Y position data is loaded from line 100 into register 94' by raising enable line 182, X adjust data is loaded from line 100 into register 28 and then latch 120 by first raising line 183 and then line 184, Y adjust data is loaded from line 100 register 28 and then latch 124 by first raising line 183 and then line 185, coarse $\theta$ adjust data is loaded from line 100 into register 150 by raising line 187, and fine $\theta$ adjust data is loaded from line 100 into register 151 by raising enable line 186. As a result, the number of lines running between CPU 20 and the control subsystems are very small.

Note that a single joystick is used to simultaneously control the main X-Y servo motors 44 and 50, the trim or adjust servo motors 66 and 68, and the $\theta$ adjust servo motor 36. This concept can, of course, be extended to any number of servo subsystems where it is desired that a single joystick or other multi-axis control mechanism and/or a single digital output data line from the CPU be used to control the various subsystems. Note also that even though individual enable lines are shown for each subsystem, a group of common lines could be used to enable the subsystems in binary-coded fashion, i.e., two lines including the single common line 100 could be used to enable two subsystems, three lines could be used to enable up to four subsystems, four lines up to eight subsystems, etc. However, in this particular case, the use of a few extra control lines is considered simpler than the introductions of a binary decoder complete with transient eliminator.

This CPU single line control concept is very good for servo control systems because the CPU serial output data bus is so much faster than the response times of the servo control subsystems. This control concept would be suitable for any type of control system wherein the device to be controlled is slow compared to the serial output data bus rate. The use of the joystick in the manner described results in the provision of a quantized output signal for application to the servo subsystems. As such, the servo motors, or stage motion, also becomes quantized. This means that the stage will step in finite steps. Although it it possible to make the steps as small as desired, there may be applications where this quantization is not desired. If this be the case, then the joystick can be connected to servo potentiometers or be entirely replaced by servo potentiometers. The output of such control potentiometers can then be connected directly to the servo motor amplifiers, in which case no CPU processing of these inputs is required.

Referring now to FIG. 8 of the drawing, there is shown a modification of the present invention in which a laser interferometer assembly 200 is used in place of the grid reference plate 13 and its associated optical detection equipment. The assembly 200 includes a laser 202, a beam splitter 204, a pair of beam benders 206 and 208, an X-direction measuring interferometer 210, and a Y-direction measuring interferometer 212. The reference plate 213 has two orthogonal side edges 214 and 215 precision ground so as to be precisely 90° relative to each other. These two edges are used as reflective mirrors for the interferometers 210 and 212.

The light outputs of the interferometers 210 and 212 are then respectively input to laser receivers (such as the HP 10780A) 201 and 203 which in the drive up/down pulse generators 286 in the X-position and Y-position control circuits as in the previously described circuit. However, since the output of a laser interferometer operating in a near infrared frequency range is typically quantized about 100 to 400 times finer than the digital output obtainable from the above-described grid reference plate, the pulse generators 286, the up/down counters 290, comparator/difference generators 292, and shift registers 294 must have their resolution capabilities increased by the same amount, i.e., by approximately eight additional binary bits. Furthermore, by inputting the data contained in the added approximately eight least significant bits into a digital-to-analog converter 295, an output signal can be obtained which is suitable for input to the dc feedback gain and equalization circuitry (see 84 in FIG. 1), and the remainder of the circuitry of the previously described X-position and Y-position subsystems can be retained.

Note, however, that the extra resolution from the laser interferometer, it is no longer necessary that the X-adjust and Y-adjust subsystems shown in FIG. 2 be employed and, therefore, the previously described drive elements 66 and 68 and their associated elements 60 through 76 can also be eliminated. Thus, a very fine resolution high speed, single drive per axis system is obtained.

The extra eight least significant bits added to the elements 290-294 permits the stage drive units 44 and 50 (FIG. 1) to locate the stage in previously unaccessible positions. Obviously, the digital adjust information which the CPU 20 previously applied to the adjust subsystems 24 and 26 is now added to the digital input applied to the shift registers 294.

Although the laser system may appear to be simpler than the previously described embodiment, it must be remembered that a laser interferometer must be enclosed within a tightly controlled environmental chamber to achieve its inherent accuracy. Thus, the ambient temperature, atmospheric pressure and humidity must be known or controlled.

On the other hand, with proper selection of the materials used for the previously described reference plate 13, the environmental conditions may not be as severe. For example, there is a readily available glass material suitable for use in the previously described reference plate which has a temperature coefficient less than 0.2 ppm/°C.

With the grid reference plate, the orthogonal relationship between the X and Y stages is maintained as a result of the appropriate placement of the grid squares on the reference plate. Thus, it is not necessary to align the X and Y assemblies at precisely the correct angle, i.e., 90° for an X-Y stage. However, with a laser interferometer reference element, one must use two orthogonally aligned reference mirrors. The alignment of these two mirrors is very critical, and each time the mirrors are diassembled, the critical alignment process must be repeated. But by using two precision ground edges of a stable reference plate, (ground to precisely the desired angle, i.e., typically 90°) as the reference reflecting mirrors, one may avoid any further precision alignment in order to obtain the precision orthogonal relationship between the stage drive assemblies. With presently available rotary index tables this angle may be ground to an accuracy of approximately 0.1 arc second.

Furthermore, if the plate also uses an optically and/or electromagnetically detectable border such as that shown at 217 and which corresponds to the boundary of the travel limits of the X-Y stage, then the stage can be automatically aligned using this border. Although the inverse situation could also be employed, typically the laser would be mounted in stationary relationship to the reference frame, and the plate would be attached to an moved with the X-Y stage.

Use of the border on the plate for automatic alignment and automatic limit stop also requires the use of appropriate border detection apparatus such as the mask 262, a linear displacement photodiode 264 (and/or other plate detection means) and X-edge and Y-edge detectors 291 and 293. Obviously, a simplified border could be produced by using the edges of the plate 213 as the border. However, to achieve the required alignment accuracy, it is believed to be more appropriate to photochemically form a precision border, such as that shown at 217, onto the plate.

FIG. 9 is an enlarged view of section 9—9 in FIG. 1. This cross sectional view shows the inter-relationship between X-Y-$\theta$ stages 32, 34, and 11, the reference substrate 13, and the self-illuminating microscope 60.

Most self-illuminating microscopes produce a background noise light at the viewing position because of the internal reflections off the microscope lenses that are common to both the viewing optics and the light source illuminating optics. Also, the reference substrate on which the reference pattern is deposited typically has a non zero reflection coefficient. These undesired reflections produce a background light level to the photo detectors even when the reflective grid pattern is not within optical view. Subsequently, the maximum signal-to-noise (S/N) ratio that can be obtained from the detection system is reduced.

In those applications where it is possible to use a transparent substrate material, it is possible to eliminate the need for a self-illuminating microscope. FIG. 10 shows a transparent reference plate substrate 313 illuminated from the back side. In this embodiment the grid pattern would typically be the inverse or "negative" of the pattern shown in FIG. 1, i.e., the grid squares are transmissive rather than reflective in this case. Microscope 360 is required only when it is desired to provide magnifying and/or focusing optics to focus the grid pattern onto the reticle 62 of FIG. 1 as before.

For space considerations it may be desireable to locate light source 302 external to the stage and to employ a light pipe or fiber optic bundle 304 to carry the light to the desired location behind the grid reference plates as shown in FIG. 10. In this case a beam reflector 306 containing a mirrored surface would typically be connected or affixed to the end of the light pipe or fiber optic bundle to provide a compact means of deflecting the light path by 90° and directing the light beam to the back of transparent or translucent reference plate 313. Obviously, the illuminating light source pattern in the region of interest 307 (area focused by microscope onto detector 64 of FIG. 1) should be as uniform as possible for optimum signal results.

As the need for greater and greater positional accuracy and alignment developes for manufacturing the processing semiconductors containing smaller and smaller geometries, it becomes apparent that in order to obtain the alignment accuracies required it will be necessary to get the positional feedback information as close as possible to the surface of the silicon wafer being processed. Ideally, one would like to include positional indicia for automatic alignment and positional control directly on the wafer as is the current practice for manual alignment. However, although numerous alignment marks have been incorporated into the mask deposition patterns, these techniques to date do not lend themselves readily to completely automatic alignment processing equipment. Among other problems, to illuminate the wafer adequately to enable detection of such markings could cause exposure of the photo resist coatings. Also, the various mask overlays and photo resist coatings tend to alter the markings and the appearance of their surroundings making each exposure step in the manufacturing process correspond to a different pattern recognition problem. In addition, the markings can interfer with the overall yield obtainable from a given wafer.

One way to overcome many of the difficulties is to apply the reference positional pattern directly to the back side of the wafer, i.e., use the wafer itself as the reference substrate material referred to herein-above. Numerous types of patterns could then be used including absolute, binary coded, positional type patterns. FIG. 11 shows a configuration with the reference position information 4B being deposited directly on the back of the wafer W. In this embodiment the reference substrate is positioned directly on the final $\theta$ stage 411. The $\theta$ stage contains a high quality optical transparent plate 412 for permitting observation of the reference pattern by the viewing optical self-illuminating microscope 460. In this case a pattern border is used to initially align the $\theta$ stage as well as to provide initial alignment to the X stage 434, and Y stage 432.

Since the placement of the wafer on the optical plate 412 cannot guarantee exact centering, the initial alignment of the X, Y and $\theta$ stage is a complex process. By using a reticle detector such as that shown in FIG. 7, two corners of the border may be detected through the use of an appropriate stage control program stored in CPU 20. Then, with the combined use of a control program and a computational program, the required alignment of the $\theta$ stage can be made. At this point the automatic alignment of the X and Y stages can proceed as before. Use of the embodiment of FIG. 11 makes it possible to provide a completely automatic alignment control system for wafer processing.

Although the present invention has been described in terms of presently preferred embodiments for precisely controlling the positioning operation of a semiconductor processing mechanism, it will be appreciated that the disclosed system is equally applicable to other types of precision control apparatus which utilize controls in other than the X, Y and $\theta$ axes. Accordingly, it is intended that the appended claims be interpreted as covering all alterations, modifications, extensions and applications as fall within the true spirit and scope of the invention.

What is claimed is:

1. An adaptive servo control system comprising:
first stage means for positioning a work piece relative to a work apparatus;
first drive means responsive to a first drive signal and operative to drive said first stage means in a first direction;
first position detector means for monitoring the position of said first stage means and for developing a first actual position signal commensurate therewith;
first input means for generating a first desired position signal corresponding to a position to which said first stage means is to be driven; and
first stage position control means including,
first comparator means for comparing said first actual position signal to said first desired position signal and for developing a first output signal when said first desired position signal equals said first actual position signal,
a second output signal when said first desired position signal is greater than said first actual signal,
a third output signal when said first desired position signal is less than first actual signal and
a fourth output signal when the absolute value of the difference between said first desired position signal and said first actual position signal is less than a predetermined number,
first tachometer means driven by said first drive means and operative to develop a first rate feedback signal,
first servo amplifier means responsive to a first servo input signal and operative to develop said first drive signal,
first variable attenuator means responsive to said fourth output signal and operative to attenuate said first rate feedback signal,
first inverter means for inverting said third output signal,
first circuit node means for variously adding together said inverted third signal, said second output signal and said attenuated first rate feedback signal to develop said first servo input signal, and
means responsive to said first output signal and operative to couple a dc signal commensurate with said first position signal to said first node means for inclusion in said first servo input signal;
whereby in response to said first desired position signal said first stage means is driven at a first rate toward said desired position and is then driven at a second rate as it approaches the desired position.

2. An adaptive servo control system as recited in claim 1 and further comprising:
second stage means for positioning said work piece relative to said work apparatus;
second drive means responsive to a second drive signal and operative to drive said second stage means in a second direction;
second position detector means for monitoring the position of said second stage means and for developing a second actual position signal commensurate therewith;
second input means for generating a second desired position signal corresponding to a position to which said second stage means is to be driven; and
second stage position control means including,
second comparator means for comparing said second actual position signal to said second desired position signal and for developing
a fifth output signal when said second desired position signal equals said second actual position signal,
a sixth output signal when said second desired position is greater than said second actual signal,
a seventh output signal when said second desired position signal is less than said second actual signal and
an eighth output signal when the absolute value of the difference between said second desired position signal and said second actual position signal is less than a predetermined number, second tachometer means driven by said second drive means and operative to develop a second rate feedback signal, second servo amplifier means responsive to a second servo input signal and operative to develop said second drive signal, second variable attenuator means responsive to said eighth output signal and operative to attenuate said second rate feedback signal, second inverter means for inverting said seventh output signal, second circuit node means for variously adding together said inverted seventh signal, said sixth output signal and said attenuated second rate feedback signal to develop said second servo input signal, and means responsive to said second output signal and operative to couple a dc signal commensurate with said second position signal to said second node means for inclusion in said second servo input signal;

whereby in response to said second desired position signal said second stage means is driven at a third rate toward said desired position and is then driven at a fourth rate as it approaches the desired position.

3. An adaptive servo control system as recited in claims 1 or 2 wherein said first position detector means includes an indicia bearing reference substrate, an optical system for casting an image of at least a portion of said reference substrate onto an apertured reticle, and photodetection means disposed behind the apertures of said reticle and operative to generate an electrical output from which said first actual position signal is developed, said control system further comprising:

third drive means responsive to a third drive signal and operative to move said reticle in said first direction relative to said optical system;

fourth drive means responsive to a fourth drive signal and operative to move said reticle in said second direction relative to said optical system;

first reticle follower means for developing a first reticle position signal;

second reticle follower means for developing a second reticle position signal;

first reticle position control means including a first servo system responsive to a first input adjust signal and said first reticle position signal and operative to generate said third drive signal; and second reticle position control means including a second servo system responsive to a second input adjust signal and said second reticle position signal and operative to generate said fourth drive signal.

4. An adaptive servo control system as recited in claims 1 or 2 and further comprising:

another stage means for rotating said work piece in a plane including a line extending in said first direction;

third drive means responsive to a rotational drive signal and operative to rotate said another stage means;

third position detector means for monitoring the rotation of said another stage means and for developing a third actual position signal commensurate therewith;

third input means for generating a third desired position signal corresponding to a position to which said another stage is to rotate; and third stage position control means including a third servo system responsive to said third desired position signal and said third actual position signal and operative to generate said rotational drive signal.

5. An adaptive servo control system as recited in claim 4 wherein said third input means also selectively generates a coarse control signal which causes said third position control means to operate in either a coarse or a fine control mode.

6. An adaptive servo control system as recited in claim 3 wherein said first and second input means includes a joystick mechanism and a microprocessor.

7. An adaptive servo control system as recited in claim 6 wherein the data output from said microprocessor is coupled to said first comparator means, said second comparator means, said first reticle position control means and said second reticle position control means via a common bus line.

8. An adaptive servo control system as recited in claim 4 wherein said first and second input means includes a joystick mechanism and a microprocessor.

9. An adaptive servo control system as recited in claim 8 wherein the data output from said microprocessor is coupled to said first comparator means, said second comparator means, said first reticle position control means and said second reticle position control means via a common bus line.

10. An adaptive servo control system as recited in claim 9 wherein the data output from said microprocessor is also coupled to said third stage position control means by said common bus line.

11. An adaptive servo control system as recited in claims 1 or 2 wherein said first position detector means includes a reflective medium carried by said first stage means and a laser interferometer.

12. An adaptive servo control system as recited in claim 11 wherein said reflective medium is formed by two or more machined edges of a plate affixed to said first stage means, the angular relationship of said edges relative to each other being precisely controlled.

13. An adaptive servo control system as recited in claim 12 wherein said plate is provided with border determining indicia and wherein said first position detector means further includes optical inspection means for detecting the location of said border determining indicia and developing a corresponding control signal.

14. An adaptive servo control system as recited in claims 1 or 2 wherein said first position detector means includes an indicia bearing reference substrate affixed to said first stage means, an optical system for casting an image of at least a portion of said reference substrate onto an apertured reticle, and photodetection means disposed to receive said image and operative to generate an electrical signal from which said first actual position signal is developed.

15. An adaptive servo control system as recited in claim 14 wherein the indicia contained on said reference substrate includes a plurality of like, rectangularly-shaped reflective surface areas arrayed in orderly rows and columns.

16. An adaptive servo control system as recited in claim 15 wherein said indicia further includes a reference strip disposed in a predetermined location on said substrate said strip being readily optically distinguishable from said rectangularly-shaped surface areas, and wherein said photodetection means develops a reference position signal when the image of said reference strip is received thereby.

17. An adaptive servo control system as recited in claim 16 and further comprising means responsive to said reference position signal and operative to provide precise automatic initial alignment and limit stop operation of said first stage means.

18. An adaptive servo control system as recited in claim 16 wherein said reference strip is a reflective band circumscribing said reflective surface areas.

19. An adaptive servo control system as recited in claim 12 wherein said substrate is provided with a reference strip disposed in a predetermined location thereon, and wherein said first position detector means further includes optical inspection means for detecting the location of said reference strip and developing a control signal commensurate therewith.

20. An adaptive servo control system as recited in claim 19 and further comprising means responsive to said control signal and operative to provide precise automatic initial alignment and limit stop operation of said first stage means.

21. An adaptive servo control system as recited in claim 14 wherein the indicia contained on said reference substrate includes a plurality of like, rectangularly-shaped opaque surface areas arrayed in orderly rows and columns.

22. An adaptive servo control system as recited in claim 21 wherein said reference strip is an opaque band circumscribing said opaque surface areas.

23. An adaptive servo control system as recited in claims 1 or 2 wherein said first position detector means includes means for detecting reference indicia disposed upon one side of said work piece.

24. An adaptive servo control system as recited in claim 23 wherein said means for detecting includes means for illuminating said reference indicia and photosensitive means for detecting movement of said photosensitive means relative to said indicia.

25. An adaptive servo control system comprising:
first and second stage means respectively movable along orthogonal axes for positioning a work piece relative to a work apparatus;
first and second drive means respectively responsive to first and second drive signals and operative to drive said first and second stage means along said axes;
position detector means for monitoring the position of said first and second stage means relative to the work apparatus and including
a reference substrate carried by one of said stage means and having orthogonal dimension position related indicia disposed thereupon, and
means for sensing said indicia and developing first and second actual position signals corresponding to the positioning of said substrate along said axes;
input means for generating first and second desired position signals corresponding to positions along said axes to which said first and second stage means are to be driven; and
first and second position control means for respectively comparing said first and second desired position signals to said first and second actual position signals and for developing said first and second drive signals for application to said first and second drive means respectively to cause said work piece to be driven to a desired position.

26. An adaptive servo control system as recited in claim 25 wherein said indicia is embodied in a plurality of uniformly configured reflective surface areas of said substrate uniformly arrayed in rows and columns.

27. An adaptive servo control system as recited in claims 25 or 26 wherein each element of said indicia is rectangular in configuration.

28. An adaptive servo control system as recited in claim 25 wherein said substrate is translucent and said indicia is opaque.

29. An adaptive servo control system as recited in claims 25, 26 or 28 wherein said means for sensing said indicia includes light source means and photodetector means.

30. An adaptive servo control system as recited in claim 29 wherein said reference substrate is a portion of the work piece.

31. An adaptive servo control system as recited in claim 29 wherein at least one of said first and second stage means is provided with a centrally located aperture through which said indicia may be sensed.

32. An adaptive servo control system as recited in claim 31 wherein said light source means is disposed on one side of said substrate and said photodetector means is disposed on the other.

* * * * *